United States Patent [19]

Burnett

[11] Patent Number: 4,953,231
[45] Date of Patent: Sep. 4, 1990

[54] SHADE ATTACHMENT FOR EYEGLASSES

[76] Inventor: David W. Burnett, Rte. 1 Box 245E, Luther, Okla. 73054

[21] Appl. No.: 381,852

[22] Filed: Jul. 19, 1989

[51] Int. Cl.$^5$ ............................ G02C 7/16; G02C 1/00
[52] U.S. Cl. ................................................ 2/13; 2/433;
351/45; 351/46; 351/158; 160/176.1
[58] Field of Search ................. 2/13, 433, 12; 351/45,
351/46, 47; 98/121.2; 160/176.1, 174; 74/421
R, 665 GA

[56] References Cited

U.S. PATENT DOCUMENTS

| | | | |
|---|---|---|---|
| 1,683,505 | 9/1928 | Walker | 2/433 |
| 2,406,190 | 8/1946 | Burdick | 2/433 X |
| 2,636,556 | 4/1953 | Light et al. | 160/176.1 X |
| 3,030,628 | 4/1962 | Crosson | 2/433 |
| 4,417,687 | 11/1983 | Grant | 98/121.2 X |
| 4,869,584 | 9/1989 | Dion | 351/45 |

FOREIGN PATENT DOCUMENTS

| | | | |
|---|---|---|---|
| 0285971 | 7/1915 | Fed. Rep. of Germany | 2/433 |
| 0118057 | of 1918 | United Kingdom | 351/47 |
| 2099172 | 12/1982 | United Kingdom | 351/45 |

Primary Examiner—Peter Nerbun
Attorney, Agent, or Firm—Jerry T. Kearns

[57] ABSTRACT

A shade attachment for eyeglasses includes a frame defining a pair of openings dimensioned for registry with lenses of a pair of conventional eyeglasses. Top and bottom resilient clips are provided on the frame and are configured for frictional engagement with top and bottom edges of eyeglass lenses. A set of transverse slats are mounted on the frame and extend across the lens openings. The salts are mounted for movement between open and closed positions by a linear drive train including a plurality of driven gears secured to axle shafts of each of the slats. A plurality of idler gears are mounted for rotation on the frame between and in mesh with each adjacent pair of driven gears. A drive gear is mounted for rotation on the frame and in mesh with one of the driven gears. A control knob is provided for manually rotating the drive gear to simultaneously open or close all of the slats extending across one of the frame openings. In a second embodiment of the present invention, the shade mechanism is provided as an integral part of a pair of eyeglasses.

2 Claims, 3 Drawing Sheets

SHADE ATTACHMENT FOR EYEGLASSES

BACKGROUND OF THE INVENTION

Field of the Invention

The present invention relates to shade attachments, and more particularly pertains to a shade attachment for eyeglasses which includes a plurality of slats mounted for pivotal movement between open and closed positions. Many individuals are attracted to designer type sunglasses, especially those including novel features and appearance. While conventional eyeglass shade attachments are known in the prior art, these devices typically utilize a single shade covering each lens and mounted for movement between open and closed positions. In order to provide a novel and unique shade attachment, the present invention provides a plurality of shade slats which extend transversely across each of the eyeglass lenses.

Description of the Prior Art

Various types of shade attachments are known in the prior art. A typical example of such a shade attachment for eyeglasses is to be found in U.S. Pat. No. 546,636, which issued to A. Brandly on Sept. 17, 1895. This patent discloses a sectional frame having adjustable slidable frame portions which mount accordion fold shade members. U.S. Pat. No. 1,255,057, which issued to C. Shoemaker on Jan. 29, 1918, discloses a shade attachment for eyeglasses including a pair of foldable spherical shade segments formed from a flexible material and including arcuate reinforcement ribs. U.S. Pat. No. 2,012,620, which issued to C. Bean et al on Aug. 27, 1935, discloses an attachment for spectacles for eliminating glare including an opaque circular plate covering each lens and provided with inclined wave formations having perforations to shield glare from vehicle headlights. U.S. Pat. No. 2,875,670, which issued to M. Thornton on Mar. 3, 1959, discloses an anti-glare spectacle including a pivotal lens for deflecting a portion of a beam from vehicle headlights. U.S. Pat. No. 2,923,943, which issued to G. Rubin on Feb. 9, 1960, discloses a shade attachment having a resilient U-shaped clip for engagement with the frame of a pair of eyeglasses.

While the above mentioned devices are directed to shade attachments, none of these devices disclose a plurality of transversely extending slats mounted for pivotal movement between open and closed positions. Additionally, none of the aforesaid devices include a collinear gear train for simultaneously opening and closing a plurality of pivotal slats. Inasmuch as the art is relatively crowded with respect to these various types of shade attachments, it can be appreciated that there is a continuing need for and interest in improvements to such shade attachments, and in this respect, the present invention addresses this need and interest.

SUMMARY OF THE INVENTION

In view of the foregoing disadvantages inherent in the known types of shade attachments now present in the prior art, the present invention provides an improved shade attachment for eyeglasses. As such, the general purpose of the present invention, which will be described subsequently in greater detail, is to provide a new and improved shade attachment for eyeglasses which has all the advantages of the prior art shade attachments and none of the disadvantages.

To attain this, representative embodiments of the concepts of the present invention are illustrated in the drawings and make use of a shade attachment for eyeglasses including a frame defining a pair of openings dimensioned for registry with lenses of a pair of conventional eyeglasses. Top and bottom resilient clips are provided on the frame and are configured for frictional engagement with top and bottom edges of eyeglass lenses. A set of transverse slats are mounted on the frame and extend across the lens openings. The slats are mounted for movement between open and closed positions by a linear drive train including a plurality of driven gears secured to axle shafts of each of the slats. A plurality of idler gears are mounted for rotation on the frame between and in mesh with each adjacent pair of driven gears. A drive gear is mounted for rotation on the frame and in mesh with one of the driven gears. A control knob is provided for manually rotating the drive gear to simultaneously open or close all of the slats extending across one of the frame openings. In a second embodiment of the present invention, the shade mechanism is provided as an integral part of a pair of eyeglasses.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved shade attachment for eyeglasses which has all the advantages of the prior art shade attachments and none of the disadvantages.

It is another object of the present invention to provide a new and improved shade attachment for eyeglasses which may be easily and efficiently manufactured and marketed.

It is a further object of the present invention to provide a new and improved shade attachment for eyeglasses which is of a durable and reliable construction.

An even further object of the present invention is to provide a new and improved shade attachment for eyeglasses which is susceptible of a low cost of manufacture with regard to both materials and labor, and which accordingly is then susceptible of low prices of sale to the consuming public, thereby making such shade attachments economically available to the buying public.

Still yet another object of the present invention is to provide a new and improved shade attachment for eyeglasses which provides in the apparatuses and methods of the prior art some of the advantages thereof, while simultaneously overcoming some of the disadvantages normally associated therewith.

Still another object of the present invention is to provide a new and improved shade attachment for eyeglasses to allow selective opening and closing of shade slats.

Yet another object of the present invention is to provide a new and improved shade attachment for eyeglasses including a collinear gear drive train to simultaneously open or close a plurality of pivotally mounted shade slats.

Even still another object of the present invention is to provide a new and improved shade attachment for eyeglasses having an attractive, ornamental and unique mechanism for mounting shade slats for movement between open and closed positions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
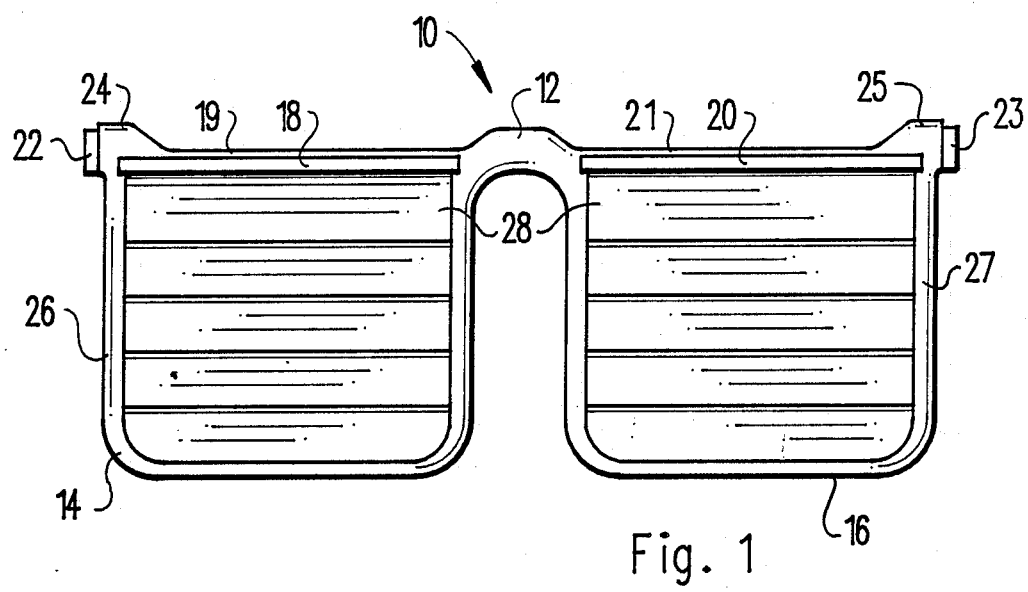
FIG. 1 is a front view of the shade attachment according to the present invention.

With reference now to the drawings, and in particular to FIG. 1 thereof, a new and improved shade attachment for eyeglasses embodying the principles and concepts of the present invention and generally designated by the reference numeral 10 will be described.

More specifically, it will be noted that the first embodiment 10 of the invention includes a frame having a pair of openings covered by a plurality of shade slats 28. The slats 28 may be formed from a tinted or opaque material and provided with a variety of different ornamental designs. The shade slats 28 may be formed from a darkly tinted material for use in welding. Each of the frame openings is defined by bottom horizontal frame portions 14, 16, parallel top horizontal frame portions 19, 21 and vertical frame portions 26, 27. The shade slats 28 covering each of the lens openings comprise two sets of slats, with all of the slats of each set being mounted for simultaneous opening and closing through the manual rotation of respective control knobs 22, 23. The control knobs 22, 23 are mounted for rotation in enlarged side frame portions 24, 25. The top vertical frame portions 19 and 21 are connected by a bridge member 12. A pair of stop bars 18 and 20 are provided on the top frame portions 19 and 21 and serve to limit the movement of the top shade slats 28.

Figures 2, 3, 4:
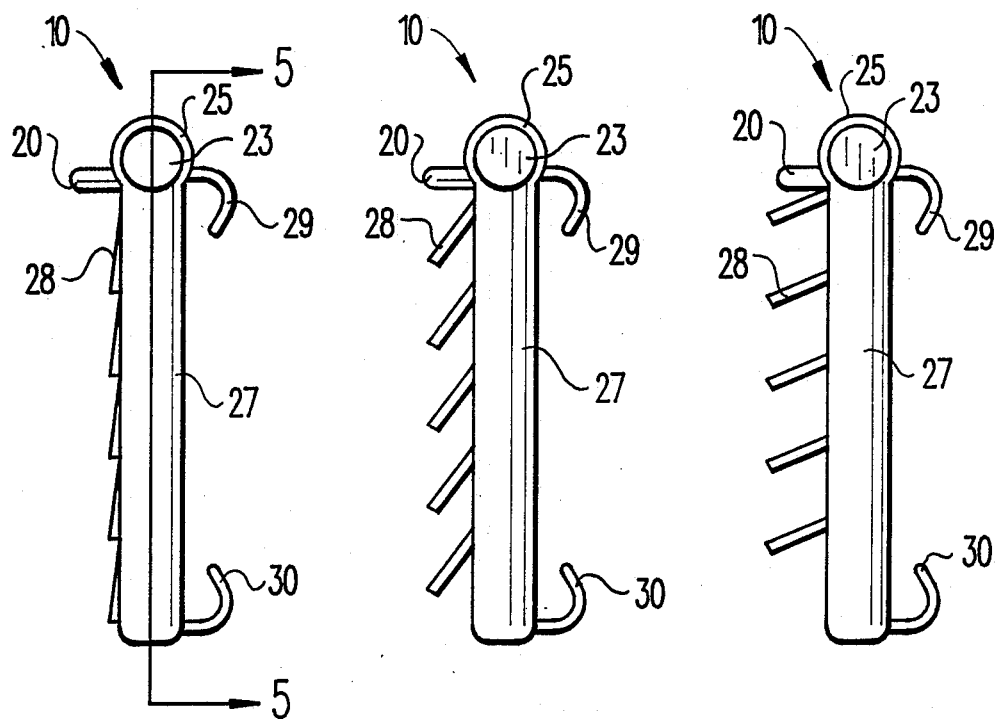
FIG. 2 is a side view of the shade attachment of FIG. 1, with the shade slats in a closed position.
FIG. 3 is a side view of the shade attachment of FIG. 1, with the shade slats in a partially open position.
FIG. 4 is a side view of the shade attachment of FIG. 1, with the shade slats in a more fully open position.

FIG. 2 illustrates a side view of the shade attachment 10, with the shade slats 28 disposed in a nearly completely closed position. Top 29 and bottom 30 resilient clip members are provided for engagement with top and bottom edge portions of the lenses of a pair of conventional eyeglasses.

FIG. 3 is a side view which illustrates the shade slats 28 disposed in a partially open position.

FIG. 4 illustrates an additional side view with the slats 28 disposed in a more fully open position. The stop bar 20 serves as an abutment to limit the movement of the uppermost shade slat to a horizontal position.

Figure 5:
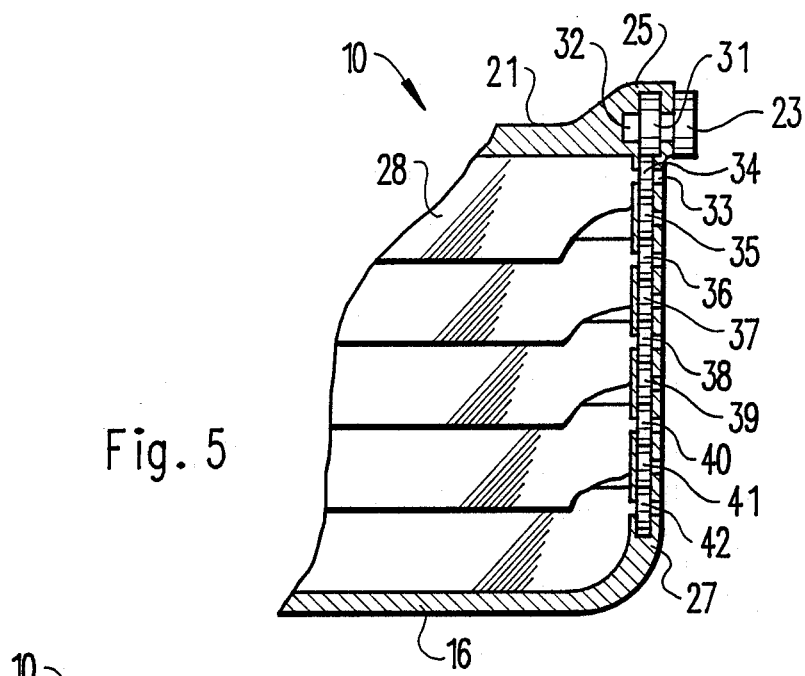
FIG. 5 is a detail view, partially in cross section, illustrating the gear drive train for simultaneously opening or closing the shade slats.

As illustrated in FIG. 5, a collinear gear train is mounted within the side frame portion 27 of the shade attachment 10. A rotatable control knob 23 includes a shaft 32. A drive gear 31 is mounted for rotation within the enlarged side frame portion 25. The drive gear 31 is in mesh with a driven gear 34 mounted on an axle shaft 33 extending from a side edge of the shade slat 28. Each of the shade slats 28 includes a similar axle shaft which is journalled for rotation in the frame portion 27. Respective driven gears 36, 38, 40 and 42 are mounted on the shade axle shafts. A plurality of idler gears 35, 37, 39 and 41 are disposed between and in mesh with each pair of adjacent driven gears. The idler gears function to reverse the direction of rotation such that each of the driven gears secured to the shade axle shafts will be rotated in the same direction. Thus, upon manual rotation of the control knob 23, the drive gear 31 causes simultaneous rotation of the collinear gear train and results in simultaneous movement of all of the shade slats 28 covering one of the lens openings. An identical mechanism is provided within the side frame portion 26 illustrated in FIG. 1 in order to provide independent opening of the two frame lens openings. Alternatively, the drive shaft 32 may extend within the top frame portions 21 and 19 to allow simultaneous control of the slats of both lens openings by rotating a single control knob.

Figure 6:
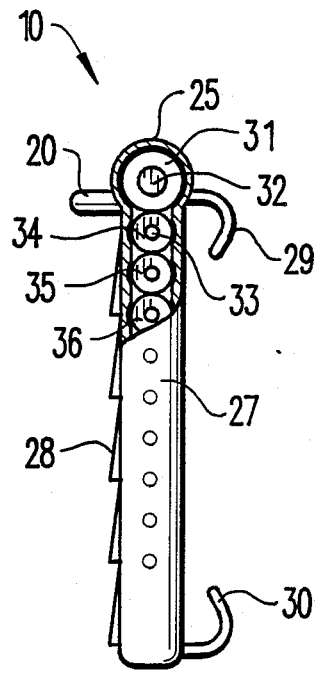
FIG. 6 is a side view, partially cut away, to further illustrate the gear drive train.

FIG. 6 is a side view, partially cut away, to further illustrate the components of the collinear shade slat actuating drive train.

Figure 7:
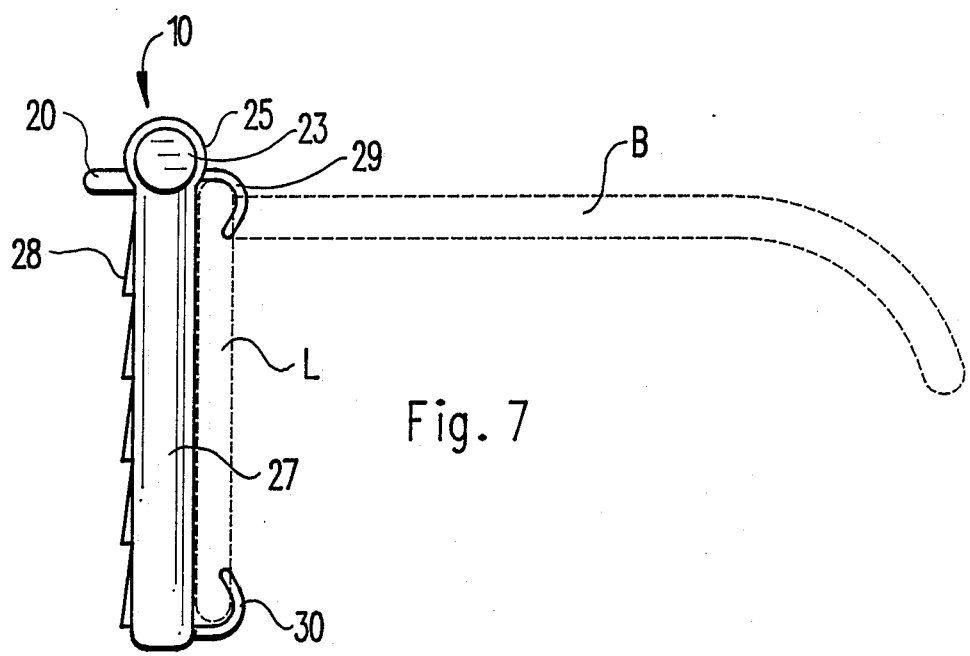
FIG. 7 is a side view diagrammatically illustrating the shade attachment as mounted on a conventional pair of eyeglasses.

FIG. 7 is a side view which diagrammatically illustrates the resilient clips 29 and 30 in frictional engagement with top and bottom edges of the lens L of a conventional pair of eyeglasses. The ear bow of the conventional eyeglasses is illustrated in phantom at B.

Figure 8:
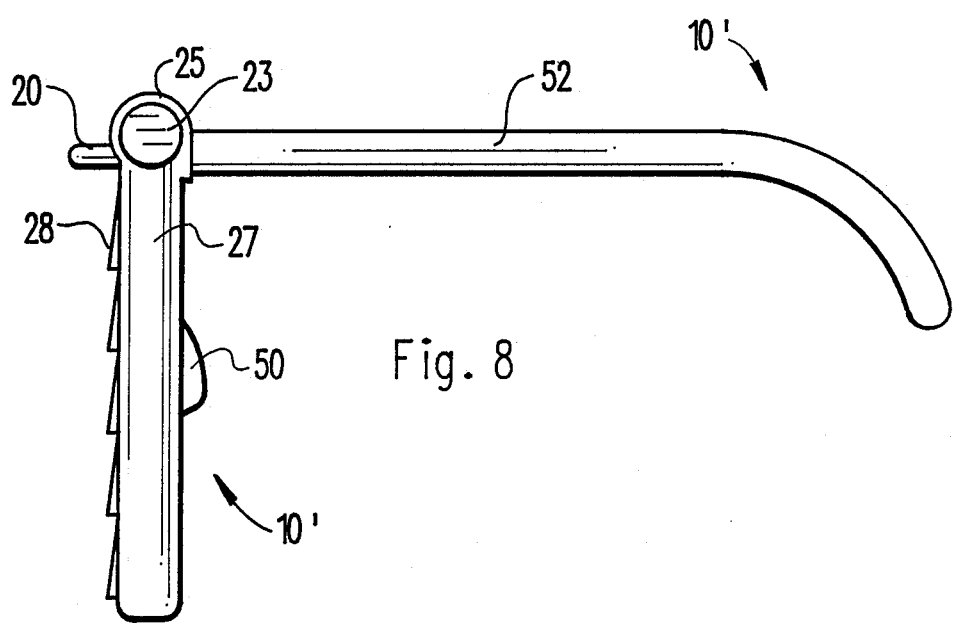
FIG. 8 is a side view illustrating a second embodiment of the present invention in which the shade mechanism is integrally formed with a pair of eyeglasses.

FIG. 8 illustrates an alternative embodiment 10' of the present invention in which the shade slat opening mechanism is integrally formed with a pair of eyeglasses. A conventional nose bridge 50 and ear bows 52 are utilized. The shade slat opening mechanism is formed as illustrated and described with respect to FIGS. 1 through 6 above, with the exception that the resilient clip members 29 and 30 are omitted.

As may now be understood, the present invention provides a shade slat mechanism which may be utilized to protect an individual from the sun's harmful rays while simultaneously providing an ornamental and unique design article.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A shade attachment for eyeglasses, comprising:
   a frame;
   a pair of openings defined by said frame, said openings dimensioned for registry with lenses of a pair of eyeglasses;
   a plurality of resilient clips on top and bottom portions of said frame, said clips configured for frictional engagement with top and bottom edges of eyeglass lenses;
   two sets of slats, each set of slats including a plurality of slats extending across one of said openings;
   an axle shaft extending from opposite ends of each of said slats and journalled for rotation in said frame;
   a driven gear secured at one end of each of said slats on said axle shafts, for rotation therewith;
   said driven gears extending in a collinear drive train;
   an idler gear mounted for rotation on said frame between and in direct meshing engagement with each adjacent pair of said driven gears;
   a drive gear mounted for rotation on said frame and in mesh with one of said driven gears;
   all of said gears disposed in a collinear drive train; and
   control means for manually rotating said drive gear.

2. A pair of eyeglasses, comprising:
   a frame;
   a pair of lenses mounted in said frame;
   two sets of slats, each set of slats including a plurality of slats extending across one of said lenses;
   an axle shaft extending from opposite ends of each of said slats and journalled for rotation in said frame;
   a driven gear secured at one end of each of said slats on said axle shafts, for rotation therewith;
   said driven gears extending in a collinear drive train;
   an idler gear mounted for rotation on said frame between and in direct meshing engagement with each adjacent pair of said driven gears;
   a drive gear mounted for rotation on said frame and in mesh with one of said driven gears;
   all of said gears disposed in a collinear drive train; and
   control means for manually rotating said drive gear.

* * * * *